(12) United States Patent
Nayak et al.

(10) Patent No.: US 12,373,298 B2
(45) Date of Patent: Jul. 29, 2025

(54) HANDLING DATA STORAGE DEVICE FAILURE USING REMOTE SYSTEM

(71) Applicant: Sandisk Technologies, Inc., Milpitas, CA (US)

(72) Inventors: Dattatreya Nayak, Bangalore (IN); Rohit Prasad, Bangalore (IN); Vinod Sasidharan, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 119 days.

(21) Appl. No.: 18/351,443

(22) Filed: Jul. 12, 2023

(65) Prior Publication Data

US 2024/0095125 A1 Mar. 21, 2024

Related U.S. Application Data (63) Continuation-in-part of application No. 17/947,075, filed on Sep. 16, 2022, now Pat. No. 12,197,287.

(Continued)

(51) Int. Cl.
*G06F 11/00* (2006.01)
*G06F 3/06* (2006.01)
(Continued)

(52) U.S. Cl.
CPC ........ *G06F 11/1438* (2013.01); *G06F 3/0619* (2013.01); *G06F 3/0659* (2013.01); *G06F 3/0679* (2013.01); *G06F 11/0772* (2013.01); *G06F 11/0787* (2013.01); *G06F 21/572* (2013.01); *G06F 2221/034* (2013.01)

(58) Field of Classification Search
CPC ............ G06F 11/0775; G06F 11/0793; G06F 11/1441
See application file for complete search history.

(56) References Cited

U.S. PATENT DOCUMENTS 7,260,680 B2 * 8/2007 Abe .................... G06F 11/1435
711/158
8,935,464 B2 1/2015 Sutardja et al.
(Continued)

FOREIGN PATENT DOCUMENTS

CN 106527651 A 3/2017

*Primary Examiner* — Amine Riad
(74) *Attorney, Agent, or Firm* — Morgan, Lewis & Bockius LLP (57) ABSTRACT

A data storage device includes interfaces for coupling the data storage device to a host system and a server system. The data storage device also includes a device memory for storing or providing data. The data storage device also includes a controller comprising a storage subsystem and a security subsystem. The storage subsystem is configured to receive a host command, receive a probe request for an exception state, generate and transmit, to the security subsystem, a report for the exception state. In response to receiving an update from the security subsystem, the storage subsystem restarts at least a portion of the controller. The security subsystem is configured to monitor and transmit a probe request to the storage subsystem, transmit the report to the server system, receive the update from the server system, and transmit the update to the storage subsystem. Methods and systems are also disclosed.

20 Claims, 5 Drawing Sheets

Related U.S. Application Data (60) Provisional application No. 63/419,127, filed on Oct. 25, 2022.

(51) Int. Cl.
 *G06F 11/07* (2006.01)
 *G06F 11/14* (2006.01)
 *G06F 21/57* (2013.01)

(56) References Cited

U.S. PATENT DOCUMENTS

| | | | |
|---|---|---|---|
| 9,448,876 B2* | 9/2016 | Ellis | G06F 11/167 |
| 11,182,232 B2 | 11/2021 | Ozturk et al. | |
| 11,609,718 B1* | 3/2023 | Karr | G06F 3/0616 |
| 2009/0204853 A1* | 8/2009 | Diggs | G06F 3/0653 |
| | | | 714/E11.184 |
| 2018/0357019 A1* | 12/2018 | Karr | G06F 11/1435 |
| 2019/0129774 A1* | 5/2019 | Konan | G06F 11/0778 |
| 2021/0286553 A1* | 9/2021 | Moiseyenko | G06F 11/302 |
| 2021/0294501 A1 | 9/2021 | Kageyama et al. | |
| 2021/0390022 A1 | 12/2021 | Siluvainathan | |
| 2022/0012117 A1 | 1/2022 | Esposito et al. | |
| 2023/0146266 A1* | 5/2023 | Choi | G06F 11/1441 |
| | | | 714/15 |
| 2023/0315346 A1* | 10/2023 | Karr | G06F 11/2007 |
| | | | 711/162 |
| 2024/0111434 A1* | 4/2024 | Chodem | G11C 5/148 |
| 2024/0202081 A1* | 6/2024 | Oh | G06F 11/3419 |

* cited by examiner

HANDLING DATA STORAGE DEVICE FAILURE USING REMOTE SYSTEM

CROSS-REFERENCE TO RELATED APPLICATION

This application is a continuation-in-part of U.S. application Ser. No. 17/947,075, filed on Sep. 16, 2022, now U.S. Pat. No. 12,197,287, and claims the benefit of U.S. Provisional Application No. 63/419,127, filed on Oct. 25, 2022, the entirety of each of which is incorporated herein by reference for all purposes.

BACKGROUND

Semiconductor memory devices, including flash memory, typically utilize memory cells to store data as an electrical value, such as an electrical charge or voltage. A flash memory cell, for example, includes a transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information. Increases in storage density have been facilitated in various ways, including increasing the density of memory cells on a chip enabled by manufacturing developments, and transitioning from single-level flash memory cells to multi-level flash memory cells, so that two or more bits can be stored by each flash memory cell.

A storage device can have failures or crashes that halt the device and affect quality of service (QoS). System recovery from a fatal error is problematic because, in many cases, a power reset or a device restart are the only solutions. Although a power reset or a restart may ensure that the device operations begin from a fresh state, this requires external input and will lead to loss of outstanding commands from the host. The storage device may not have a deterministic mechanism to verify whether a command was successfully executed or not. This leads to loss of in-progress operations and/or data in system static memory. In addition, the integrity of in-progress operations cannot be guaranteed.

The description provided in the background section should not be assumed to be prior art merely because it is mentioned in or associated with the background section. The background section may include information that describes one or more aspects of the subject technology, and the description in this section does not limit the invention.

BRIEF DESCRIPTION OF THE DRAWINGS

The accompanying drawings, which are included to provide a further understanding of the disclosure, are incorporated in and constitute a part of this disclosure, illustrate embodiments of the disclosure, and together with the description serve to explain principles of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The present description relates in general to data storage systems and methods, and more particularly to, for example, without limitation, exception handling using a security subsystem in a storage device.

Figure 1:
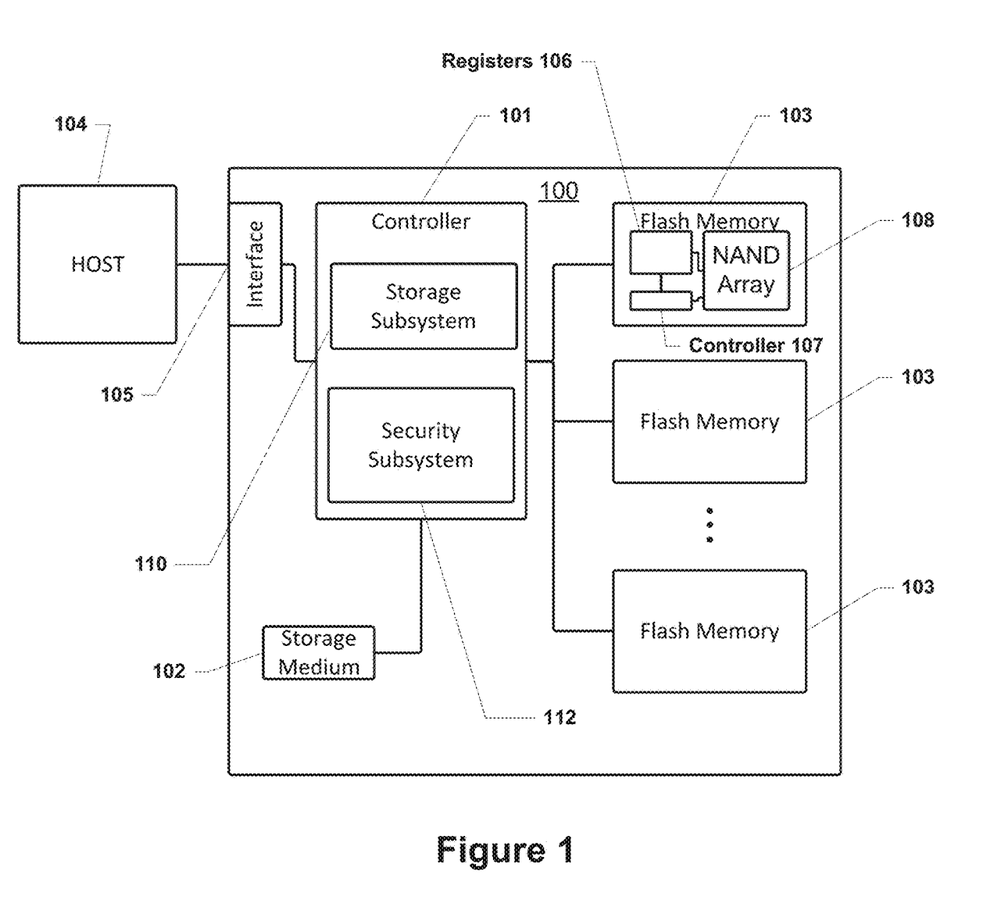
FIG. 1 is a block diagram illustrating components of an example data storage system, according to one or more embodiments.

FIG. 1 is a block diagram illustrating components of an example data storage system, according to aspects of the subject technology. As depicted in FIG. 1, in some aspects, a data storage system 100 (e.g., a solid state drive (SSD)) includes a data storage controller 101, a storage medium 102, and a flash memory array including one or more flash memory 103. The data storage controller 101 may be sometime referred to as a controller. A controller may include one or more controllers. The controller 101 may use the storage medium 102 for temporary storage of data and information used to manage the data storage system 100. The controller 101 may include several internal components (not shown), such as a read-only memory, other types of memory, a flash component interface (e.g., a multiplexer to manage instruction and data transport along a serial connection to the flash memory 103), an input/output (I/O) interface, error correction circuitry, and the like. In some aspects, the controller 101 may include a storage subsystem 110 and a security subsystem 112. In some aspects, these elements of the controller 101 may be built in two separate chips. In other aspects, they may be integrated into a single chip. In other aspects, these elements may be separated on their own personal computer (PC) board.

In some implementations, aspects of the subject disclosure may be implemented in the data storage system 100. For example, aspects of the subject disclosure may be integrated with the function of the data storage controller 101 or may be implemented as separate components for use in conjunction with the data storage controller 101.

The controller 101 may also include one or more processors that may be configured to execute code or instructions to perform the operations and functionality described herein, manage request flow and address mappings, and to perform calculations and generate commands. The one or more processors of the controller 101 may be configured to monitor and/or control the operation of the components in the data storage controller 101. A processor may be a microprocessor, a microcontroller, or a digital signal processor (DSP). A processor may be implemented using, for example, an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on read-only-memory (ROM) within the controller 101 and/or its processor. One or more sequences of instructions may be software stored and read from the storage medium 102, the flash memory 103, or received from a host device 104 (e.g., via a host interface 105). ROM, the storage medium 102, the flash memory 103, represent examples of machine or computer readable media on which instructions/code executable by the controller 101 and/or its processor may be stored. Machine or computer readable media may generally refer to any medium or media used to provide instructions to the controller 101 and/or its processor(s), including volatile media, such as dynamic memory used for the storage media 102 or for buffers within the controller 101, and non-volatile media, such as electronic media, optical media, and magnetic media. A media may be a non-transitory media.

In one or more examples, the storage subsystem 110 may be a controller, such as a processor or a sub-processor. In one or more examples, the security subsystem 112 may be a controller, such as a processor or a sub-processor.

In some aspects, the controller 101 may be configured to store data received from the host device 104 in the flash memory 103 in response to a write command from the host device 104. The controller 101 is further configured to read data stored in the flash memory 103 and to transfer the read data to the host device 104 in response to a read command from the host device 104. In some aspects, these operations may be performed by the storage subsystem 110 of the controller 101. A host device 104 may be sometimes referred to as a host or a host system.

The host device 104 represents any device configured to be coupled to the data storage system 100 and to store data in the data storage system 100. The host device 104 may be a computing system such as a personal computer, a server, a workstation, a laptop computer, a personal digital assistant (PDA), a smart phone, or the like. Alternatively, the host device 104 may be an electronic device such as a digital camera, a digital audio player, a digital video recorder, or the like.

In some aspects, the storage medium 102 represents volatile memory used to temporarily store data and information used to manage the data storage system 100. According to aspects of the subject technology, the storage medium 102 is random access memory (RAM), such as double data rate (DDR) RAM. Other types of RAM may be also used to implement the storage medium 102. The memory 102 may be implemented using a single RAM module or multiple RAM modules. While the storage medium 102 is depicted as being distinct from the controller 101, those skilled in the art will recognize that the storage medium 102 may be incorporated into the controller 101 without departing from the scope of the subject technology. Alternatively, the storage medium 102 may be a non-volatile memory, such as a magnetic disk, flash memory, peripheral SSD, and the like.

As further depicted in FIG. 1, the data storage system 100 may also include the host interface 105. The host interface 105 may be configured to be operably coupled (e.g., by wired or wireless connection) to the host device 104, to receive data from the host device 104 and to send data to the host device 104. The host interface 105 may include electrical and physical connections, or a wireless connection, for operably coupling the host device 104 to the controller 101 (e.g., via the I/O interface of the controller 101). The host interface 105 may be configured to communicate data, addresses, and control signals between the host device 104 and the controller 101. Alternatively, the I/O interface of the controller 101 may include and/or be combined with the host interface 105. The host interface 105 may be configured to implement a standard interface, such as a small computer system interface (SCSI), a serial-attached SCSI (SAS), a fiber channel interface, a peripheral component interconnect express (PCIe), a serial advanced technology attachment (SATA), a universal serial bus (USB), or the like. The host interface 105 may be configured to implement only one interface. Alternatively, the host interface 105 (and/or the I/O interface of controller 101) may be configured to implement multiple interfaces, which may be individually selectable using a configuration parameter selected by a user or programmed at the time of assembly. The host interface 105 may include one or more buffers for buffering transmissions between the host device 104 and the controller 101.

The flash memory 103 may represent a non-volatile memory device for storing data. According to aspects of the subject technology, the flash memory 103 includes, for example, a not-and (NAND) flash memory. The flash memory 103 may include a single flash memory device or chip, or (as depicted in FIG. 1) may include multiple flash memory devices or chips arranged in multiple channels. The flash memory 103 is not limited to any particular capacity or configuration. For example, the number of physical blocks, the number of physical pages per physical block, the number of sectors per physical page, and the size of the sectors may vary within the scope of the subject technology.

The flash memory may have a standard interface specification so that chips from multiple manufacturers can be used interchangeably (at least to a large degree). The interface hides the inner working of the flash and returns only internally detected bit values for data. In aspects, the interface of the flash memory 103 is used to access one or more internal registers 106 and an internal flash controller 107 for communication by external devices (e.g., the controller 101). In some aspects, the registers 106 may include address, command, and/or data registers, which internally retrieve and output the necessary data to and from a NAND memory cell array 108. A NAND memory cell array 108 may be sometimes referred to as a NAND array, a memory array, or a NAND. For example, a data register may include data to be stored in the memory array 108, or data after a fetch from the memory array 108 and may also be used for temporary data storage and/or act like a buffer. An address register may store the memory address from which data will be fetched to the host device 104 or the address to which data will be sent and stored. In some aspects, a command register is included to control parity, interrupt control, and the like. In some aspects, the internal flash controller 107 is accessible via a control register to control the general behavior of the flash memory 103. The internal flash controller 107 and/or the control register may control the number of stop bits, word length, receiver clock source, and may also control switching the addressing mode, paging control, coprocessor control, and the like.

In some aspects, the registers 106 may also include a test register. The test register may be accessed by specific addresses and/or data combinations provided at the interface of flash memory 103 (e.g., by specialized software provided by the manufacturer to perform various tests on the internal components of the flash memory). In further aspects, the test register may be used to access and/or modify other internal registers, for example the command and/or control registers. In some aspects, test modes accessible via the test register may be used to input or modify certain programming conditions of the flash memory 103 (e.g., read levels) to dynamically vary how data is read from the memory cells of the memory arrays 108. The registers 106 may also include one or more data latches coupled to the flash memory 103.

It should be understood that in all cases data may not always be the result of a command received from the host 104 and/or returned to the host 104. In some aspects, the controller 101 may be configured to execute a read operation independent of the host 104 (e.g., to verify read levels or a bit error rate (BER)). The predicate words "configured to," "operable to," and "programmed to" as used herein do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

In some aspects, when the data storage device has an exception, the exception recovery process may be transparent to the host 104; the host 104 may not perform any action for the device to resume operations after an internal restart.

Figure 2:
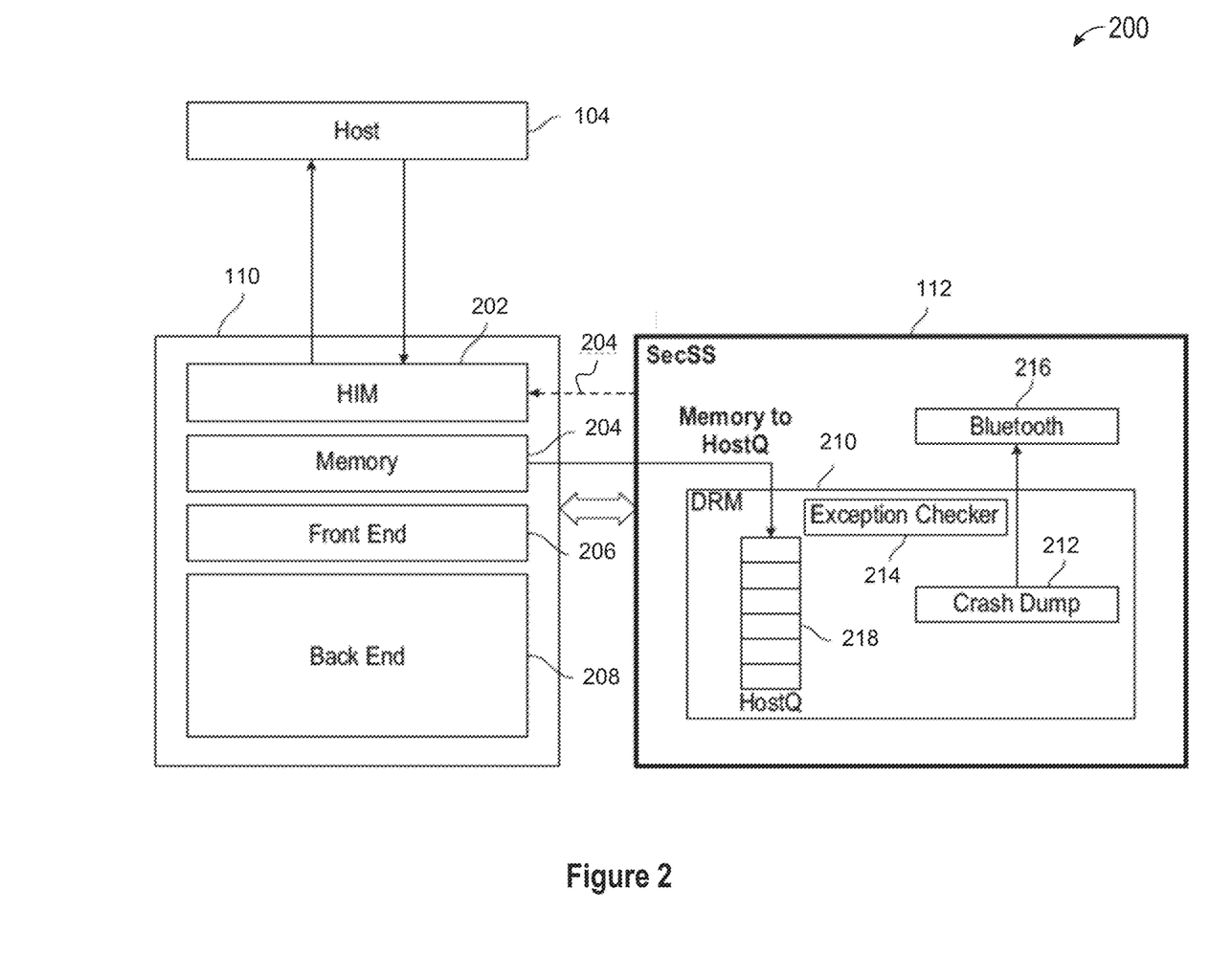
FIG. 2 is a block diagram of a storage device architecture, according to one or more embodiments.

FIG. 2 is a block diagram of an example storage device architecture 200, according to one or more embodiments. In some aspects, as described above, the data storage device 100 may include the storage subsystem 110 and the security subsystem 112. In one or more aspects, having two subsystems, including for example a separate processor for each of the two subsystems, advantageously ensures providing resilience and/or fault tolerance when the storage subsystem enters an exception state that may be a fatal crash. In one or more aspects, having a security subsystem separately from the storage subsystem can advantageously ensure monitoring the storage subsystem and recovering from an exception gracefully, even without informing a host system.

The storage subsystem 110 may include a host interface manager (HIM) 202 for managing an interface to the host 104, for receiving from and transmitting commands to the host 104. The storage subsystem 110 may also include a front-end memory 204, a front end 206, and a back end 208. The security subsystem 112 may provide security to the storage device 100. In some aspects, the data storage device 100 may include separate power domains for the storage subsystem 110 and the security subsystem 112. In this regard, the power domain for the storage subsystem 110 is different from the power domain for the security subsystem 112. This can allow the security subsystem 112 to be powered on even when the storage subsystem 110 is powered down. In one or more aspects, when the storage subsystem 110 enters an exception state or in a recovery state, the storage subsystem 110 can be powered down, but the security subsystem 112 can remain powered on and perform various recovery operations described herein to advantageously ensure providing resilience and/or fault tolerance.

In some aspects, the security subsystem 112 includes a device recovery manager (DRM) 210 (sometimes referred to as a device recovery circuit). In some aspects, the DRM 210 may be disposed in a static memory (e.g., a static RAM) of the security subsystem 112. The DRM 210 may include one or more of the following functionalities: (i) monitoring (e.g., using an exception checker 214) the storage subsystem 110 for any exception state, (ii) reinitializing (or initialize) pending operations after the storage subsystem 110 restarts, and (iii) providing a crash dump and/or receive updates. In some aspects, the security subsystem 112 may throttle the host 104 in case the data storage device 100 takes longer than a predetermined threshold amount of time to respond. The threshold time may be determined based on a protocol-based time-out. For example, the threshold time may be 70% of the time allowed for the device to respond, for a given protocol. If the data storage device 100 is not responding within the protocol defined time-out, the host 104 may reset or power cycle the data storage device 100. In some aspects, the polling period of the exception checker 214 may be within the time-out of the host 104. This may help preserve a current state of a host queue (HostQ) 218 used to store commands from the storage subsystem 110. The exception checker 214 may poll the storage subsystem 110 in an efficient manner where it checks processor(s) in the storage subsystem first, and after the exception checker 214 finds an exception, the exception checker 214 may poll sub-modules within the processor. This may be beneficial in preparing a first failure analysis. Depending on time limits or time-outs for a command based on a host protocol, the exception checker 214 may generate a comprehensive report or a crash dump 212 (sometimes referred to as a crash report or a report). The exception checker 214 may also collect information from the memory 204, to obtain a snapshot of outstanding commands (e.g., higher priority operations) of the storage subsystem 110. In some aspects, a maximum permissible poll-time may be dependent on a host protocol. In some aspects, the security subsystem 112 may control the host interface manager (HIM) 202 when the storage subsystem 110 is recovering from an exception.

In some aspects, when the data storage device 100 enters a fatal exception, the fatal exception may be caused by processor failures, hardware functional block errors, firmware deadlocks, and/or firmware asserts. Processor failures may include unexpected failure of a register fetch/load instruction (e.g., such failure within the storage subsystem 110). Hardware functional block error may include a static RAM (SRAM) failures within the blocks. Firmware deadlocks may include two processors competing for a same memory access but neither releasing another resource that is needed. Firmware asserts may include unexpected flow/path chosen by software/firmware.

If the firmware or the controller 101 (e.g., the storage subsystem 110) cannot handle an exception, in some situations, the only recovery method with conventional devices to resume device operations is a power off and power on (sometimes referred to as a power reset). In some aspects, the DRM 210 may act as a device health module and sniff or monitor the storage subsystem 110 for such issues. In some aspects, the DRM 210 (e.g., the exception checker 214 of the DRM 210) may monitor pending operations in the storage subsystem 110 and detect that there is no progress and/or response with respect to the pending operations. The DRM 210 may use a simple polling mechanism for this process. In some aspects, when the DRM 210 identifies a fatal exception, the DRM 210 may track and/or store pending device operations. In some aspects, such operations may be stored in a number of layers (e.g., the front-end memory 204, the front end 206, the back end 208). In some aspects, the DRM 210 may store host commands and/or internal commands of the controller 101. In some aspects, device-host interaction may be via commands that are stored in the front-end (FE) memory 204. In some aspects, the DRM 210 may access a high level of commands (e.g., a first layer of commands between host and device, such as a small computer system interface (SCSI) read, write commands in universal serial bus (USB) protocol). In some aspects, the DRM 210 may copy the host commands in the same order as they are received from the host 104 to a queue (e.g., HostQ 218) within the DRM 210. In some aspects, the DRM 210 may be provided with data structures and/or memory addresses during an initialization phase. The initialization phase may include the time period between from a power cycle of the storage device until the device is ready to accept or process host commands. An example data structure in the memory 204 may include Command_ID (an identifier for a command), Command_Type (a type for the command), Command_Length (a length of the command), Command_Flags (flags for the command), and/or Host_protocol_flags (flags for the host protocol). Memory regions may include command queues. An example start address may be 0xF0000000 (in a 32-bit system), 0xF000000000000000 (in a 64-bit system). The data structures may be predefined during design and/or development of the DRM 210.

In some aspects, the DRM 210 may generate a crash dump report 212. An example crash report is shown below for illustration:

| Sample report |
|---|
| { <br> Origin, <br> Exception_type, // an exception type <br> Failing_command_info, // information on a failing command <br> Command_currently_being_serviced[MAX_NUM_COMMANDS_IN QUEUE] <br>   { <br>     LBA, // a logical block address <br>     Length, // length of the command <br>     Type(R/W) // type of command, if it is read (R) or a write (W) <br>   } <br> Timestamp, // a timestamp for the sample report <br> } |

In some aspects, the DRM 210 may throttle the host 104. In some aspects, this may be accomplished using a handshake message to the host 104, indicating the operations will take longer to complete. In some aspects, the security subsystem 112 may be used to control (220) the HIM 202 and/or to notify the host 104 about throttling. In some aspects, the DRM 210 may initialize a warm or a cold boot for the storage subsystem 110. A warm or a cold boot may be categorized based on exception categories. For example, firmware assert or firmware deadlock may include a warm boot, since these are software issues. A processor halt or a crash is a hardware issue so those categories may be handled using a complete or cold boot. In some aspects, this may help ensure that the processors, hardware components and/or firmware structures are reset and the data storage device 100 can begin operations. In some aspects, the DRM 210 may mimic the host 104 and copy the host commands to the front-end memory 204.

In some aspects, the DRM 210 may copy internal commands of the controller 101 to appropriate memory. Internal commands may include commands for garbage collection, write/read exception handling, or firmware control block updates to the device memory 103 (sometimes referred to as NAND). In some aspects, the appropriate memory includes data-path memory. There may not be a fixed memory for internal commands when the device issues an internal command. In some aspects, memory may be allocated dynamically from a free pool, command is serviced, and the memory is returned. The dynamic pool may be referred to as MEMORY_RESERVED_FOR_INTERNAL_OPERATIONS. In some aspects, the DRM 210 may stop throttling and normal operations may resume for the host 104 and/or the data storage device 100.

Figure 3:
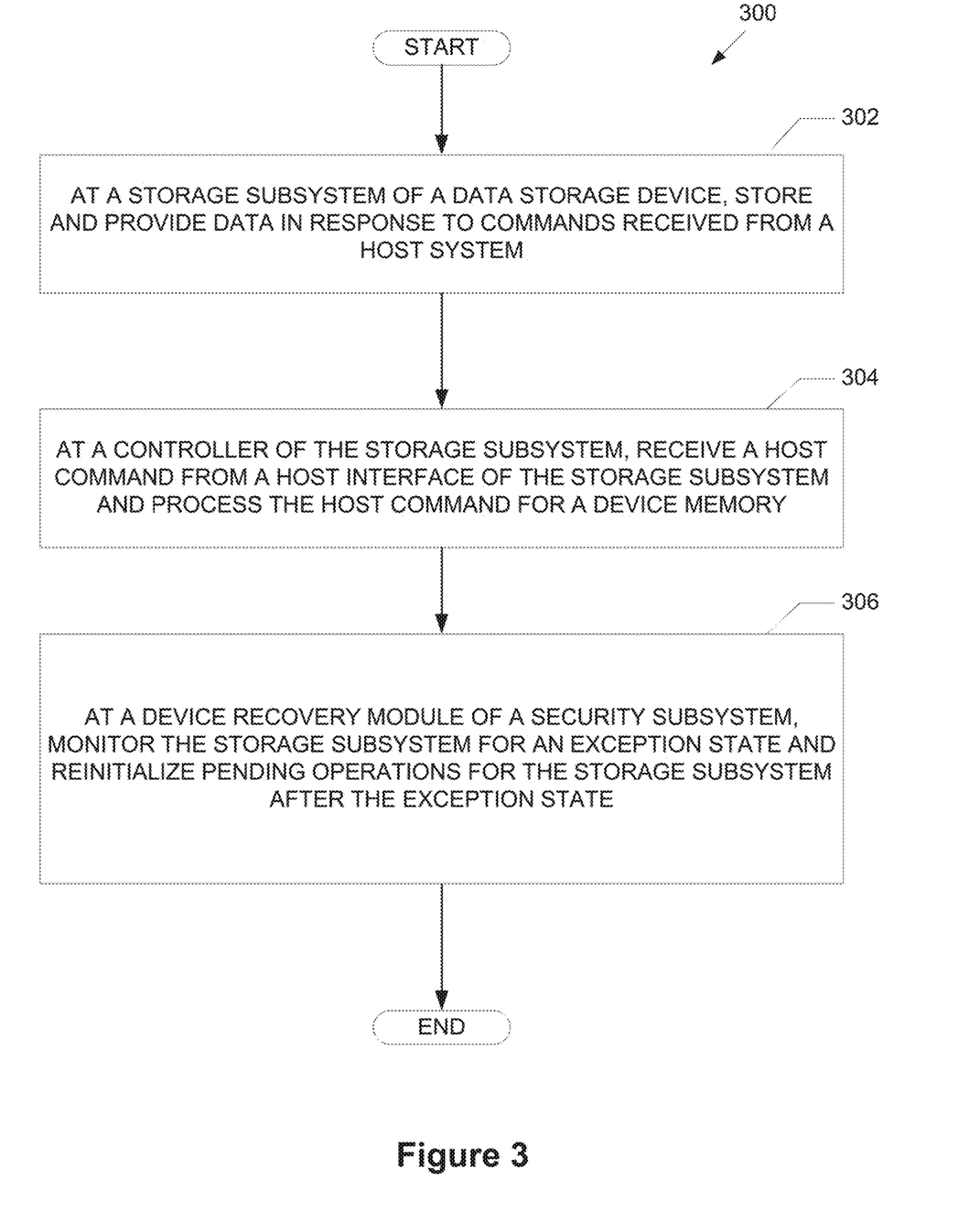
FIG. 3 is a flowchart of an example process for exception handling in a data storage device using a security subsystem, according to one or more embodiments.

It may be instructive to describe the structures shown in FIGS. 1 and 2 with respect to FIG. 3 which is a flowchart illustrating an example process 300 for exception handling using a security subsystem in a storage device, according to some embodiments. One or more blocks of FIG. 3 may be executed by a computing system (including, e.g., a controller 107 of a flash memory, a data storage controller 101 of a data storage system 100 or a solid-state storage device (SSD), a processor, or the like). Examples of a computing system or a controller may be the controller 101. Similarly, a non-transitory machine-readable medium may include machine-executable instructions thereon that, when executed by a computer or machine (e.g., the storage device 100 or its component(s)), perform the processes of FIG. 3. The steps of process 300 may be implemented as hardware, firmware, software, or a combination thereof. The data storage device 100 may include a host interface 105 for coupling the data storage device 100 to a host system 104. The data storage device 100 may also include a device memory 103 for storing or providing data in response to commands receive from the host system 104. The data storage device 100 may also include a controller 101 which may include a storage subsystem 110 and a security subsystem 112.

In step 302, a device memory (e.g., the device memory 103) stores or provides data in response to commands received from the host system 104. For example, the storage subsystem 110 may cause the device memory 103 to store or provide data.

In step 304, a storage subsystem 110 of a controller (e.g., the controller 101) may receive a host command from the host interface, and process the host command for the device memory 103.

In step 306, a device recovery circuit 210 of a security subsystem 112 of the controller 101 may monitor the storage subsystem 110 for an exception state, and reinitialize pending operations for the storage subsystem 110 after the exception state.

In some aspects, the device recovery circuit 210 causes throttling the host system 104 if the storage subsystem 110 takes longer than a predetermined threshold time to recover from the exception state.

In some aspects, the security subsystem 112 controls the host interface when the storage subsystem recovers from the exception state.

In some aspects, the exception state is caused by at least one of: a processor failure, a hardware error, a firmware deadlock, or a firmware assert.

In some aspects, the device recovery circuit 210 monitors the storage subsystem for the exception state at periodic time intervals. For example, suppose a host command has a time-out period of 100 milliseconds. The monitoring (sometimes referred to as polling or sniffing) may have a time interval of 25 milliseconds (i.e., $\frac{1}{4}^{th}$ of the time-out period of the host command). This is so that enough time is available for recovery process before command time-out. Some aspects may use methods other than polling or sniffing. For example, the storage sub-system may have a self-monitoring circuit, software and/or firmware, which may generate an interrupt to the security subsystem to trigger recovery.

In some aspects, the device recovery circuit 210 causes transmitting a crash dump to the host system 104 and receive updates. For example, the crash dump may be transmitted via a Bluetooth or a similar communication mechanism in the security subsystem; when the storage subsystem crashes, it cannot communicate the crash dump report.

In some aspects, the device recovery circuit 210 stores the pending operations for the storage subsystem 110 at periodic time intervals. For example, the periodic time intervals may be a part of the sniffing or polling time-interval described above.

In some aspects, the security subsystem includes a host queue (e.g., the HostQ 218), and the device recovery circuit 210 stores the pending operations in the host queue.

In some aspects, the storage subsystem 110 includes a front-end memory 204 that stores the commands received from the host system 104, and the device recovery circuit 210 stores the pending operations for the storage subsystem 110 in a same order as the commands received from the host system 104 in the front-end memory 204.

In some aspects, the controller 101 provides a state of the storage subsystem 110 to the device recovery circuit 210 during initialization of the storage subsystem. The device recovery circuit 210 uses the state of the storage subsystem to reinitialize the pending operations for the storage subsystem 110. In some aspects, data structures for the state of the storage subsystem may be pre-defined while designing or developing the DRM or data recovery circuit.

In some aspects, the device recovery circuit 210 causes throttling the host system 104 based on the exception state.

In some aspects, the data storage device 100 includes a plurality of power domains that includes a first power domain to power the storage subsystem 110 that is different from a second power domain to power the security subsystem 112.

In some aspects, the data storage device 100 continues to power the security subsystem 112 after the storage subsystem 110 enters the exception state or during recovery of the storage subsystem 110 from the exception state.

In some aspects, the security subsystem 112 includes a static memory and the host queue 218 is disposed in the static memory. In some aspects, the device recovery circuit may refer to a device recovery module or manager. A hardware implementation or circuit-level implementation in an application specific integrated circuit (ASIC) may provide performance advantages (e.g., speed improvements) over a software implementation. A software implementation, on the other hand, may provide more flexibility for changing or updating functionalities. In some aspects, the device recovery module, manager or software may be stored in non-volatile memory and later (e.g., during initialization of the security processor or the security subsystem) copied to the static memory (e.g., a static random access memory (RAM)) of the security processor or security subsystem for execution. The host queue may also be stored in the static RAM dedicated for handling the host commands. The static RAM may be called a command RAM or a host-queue RAM, in some aspects.

In some aspects, the device recovery circuit 210 initializes a warm boot or a cold boot for the storage subsystem based on the exception state.

In some aspects, the device recovery circuit 210: determines a category of the exception state; in accordance with a determination that the category of the exception state is a firmware assert or a deadlock due to software errors, cause a warm boot of the storage subsystem 110; and in accordance with a determination that the category of the exception state is a processor halt or a crash due to hardware errors, cause a cold reboot that includes a complete reboot of the storage subsystem 110. This may help ensure that processors, hardware functional blocks and/or firmware structures are reset and device can begin operations.

In some aspects, the device recovery circuit 210 copies, from the storage subsystem 110, information related to garbage collection, write or read exception handling, or firmware control block updates to the device memory, based on the exception state.

In some aspects, the device recovery circuit 210 is further configured to generate a crash report based on the exception state.

In some aspects, the crash report 212 includes an origin of the exception state, a type of the exception state, information related to a failing command for the exception state, or a command serviced during the exception state, or a time-stamp for the exception state.

Figure 4:
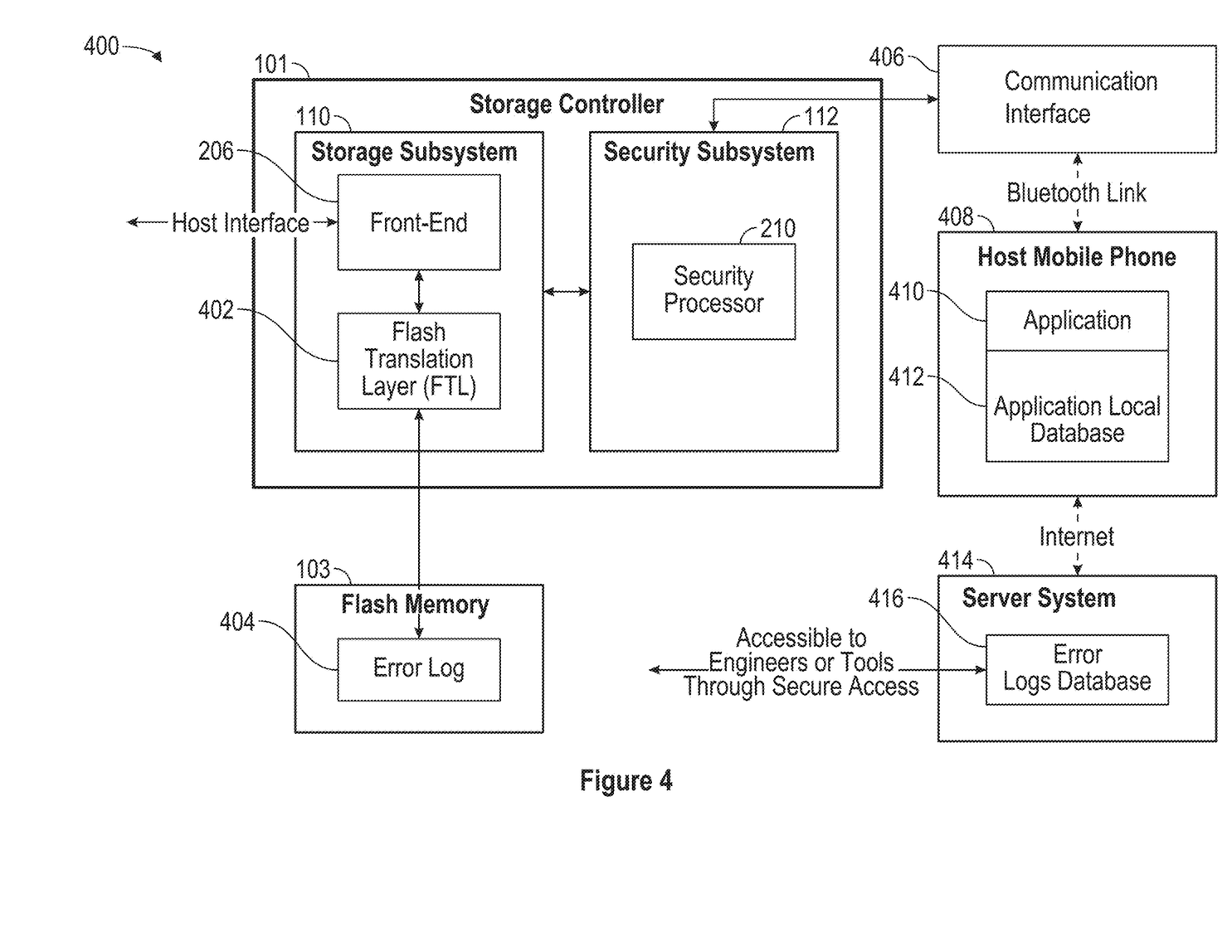
FIG. 4 is a block diagram of an example system architecture for handling a data storage device failure, according to one or more embodiments.

FIG. 4 is a block diagram of an example system architecture 400 for handling a data storage device failure, according to one or more embodiments. In some aspects, as described above, the data storage device 100 may include the storage subsystem 110 and the security subsystem 112. As described above, in one or more aspects, having two subsystems, including for example a separate processor for each of the two subsystems, advantageously ensures providing resilience and/or fault tolerance when the storage subsystem enters an exception state that may be a fatal crash. In one or more aspects, having a security subsystem separately from the storage subsystem can advantageously ensure monitoring the storage subsystem and recovering from an exception gracefully, even without informing a host system.

The data storage device may include a communication interface 406 (e.g., a Bluetooth chip) that couples the security subsystem 112 to a server system 414 (via e.g., a host mobile phone 408). In the example system architecture 400 shown in FIG. 4, the communication interface 406 connects the security subsystem 112 to a host mobile phone 408 that is connected to the server system 414 via the Internet. The host mobile phone 408 may include an application 410 and/or a local database 412 for storing secure field firmware upgrade packets received from the server system 414 and/or storing error logs. In some aspects, the server system 414 includes an error logs database 416, which may be accessible to engineers or tools through secure access. In some advantageous aspects, the security subsystem 112 in conjunction with the application 410, using a communication interface 406 such as Bluetooth (which is separate from the host interface 105) may be used to lock or unlock the data storage device 100. Such locking/unlocking using a separate communication interface and/or a separate device which is not a host (e.g., a mobile phone) may provide a more secure path than locking/unlocking via a host. For example, a host may have a physical coupling to the data storage device which makes it loss-prone. For example, when a laptop containing the data storage device is lost, it is not possible to lock the data storage device via the laptop. But if the data storage device has Bluetooth connectivity, it is possible to connect to the data storage device via the Bluetooth or other connectivity or interface, and use the connectivity to disable or lock the data storage device. In some aspects, alternate security protocols may be deployed using the Bluetooth connectivity. Additionally, standard host drivers (e.g., universal serial bus (USB), serial advanced technology attachment (SATA)) need not be modified for this alternate path. In other words, no host action may be required for enabling the secure transfer of the report to and/or the update from the server system. Thus, utilizing the security subsystem 112 (as well as the separate communication interface 406 and a separate device such as a mobile phone 408) can enable secure transfer of the report to and/or the update from the server system 414. Furthermore, in some advantageous aspects, because the security subsystem 112 is on a power domain that is separate from the power domain of the storage subsystem 110, the security subsystem 112 can perform various operations described herein even if there is no power or power failure in the storage subsystem 110.

The storage subsystem 110 may generate a report regarding an exception while the controller 101 is handling the exception. In some aspects, the storage subsystem 110 provides the content of the report because the crash occurred in the storage subsystem 110, and the security subsystem 112 monitors and/or transfers the report. The storage subsystem 110 includes a flash translation layer 402 (FTL) configured to collect data for the report. The FTL 402 is configured to translate a logical block address in the host command to a physical address on the device memory 103 (which may be sometimes referred to as a flash memory or a NAND memory). The storage subsystem 110 may be configured to probe modules of the controller 101 to identify exceptions, and the FTL 402 may have information regarding which module experienced the exception. In some aspects, the data storage device 100 may include a host interface (e.g., a Universal Serial Bus (USB) interface, the interface 105) for coupling the data storage device to the host system 104. In some aspects, the data storage device 100 includes the device memory 103 for storing or providing data in response to commands received from the host system 104. In some aspects, the data storage device 100 includes the communication interface 406 for communicatively coupling the data storage device to the server system 414.

In some aspects, the controller 101 comprises the storage subsystem 110 that is configured to: receive a host command received from the host interface 105; in response to detecting an exception state while processing the host command: generate and transmit, to the security subsystem 112, a report for the exception state; and in response to receiving an update from the security subsystem 112, restart at least a portion of the controller 101, based on the report and the update. In one or more examples, the storage subsystem 110 may restart a portion of the controller 101 (rather than the entire controller 101). In some aspects, the storage subsystem 110 and/or the security subsystem 112 may restart a portion of the controller. For example, suppose due to a crash the storage subsystem 110 is not responsive, the security subsystem 112 may perform the restart. Examples of a portion of controller include the host interface manager (HIM) 202, the front-end memory 204, the front end 206, and the back end 208.

The controller 101 also includes the security subsystem 112 configured to: in response to receiving the report from the storage subsystem 110, transmit the report to the server system 414 via the communication interface; and in response to receiving the update from the server system 414, via the communication interface 406, transmit the update to the storage subsystem 110.

In some aspects, the storage subsystem 110 is further configured to handle the exception state. In some aspects, the storage subsystem 110 is further configured to generate the report while handling the exception state. In some aspects, the storage subsystem 110 is further configured to, after the exception state is handled, initiate a power cycle for the data storage device 100 to prepare the device memory 103 to accept new host commands.

In some aspects, the exception state is caused by at least one of: a processor failure, a hardware error, a firmware deadlock, or a firmware assert.

In some aspects, the storage subsystem 110 includes a flash translation layer 402 that is configured to: translate a logical block address for the host command to a physical address on the device memory 103; and generate the report by probing different components of the storage subsystem 110 to identify the exception state.

In some aspects, the report comprises an exception origin that indicates a component of the data storage device 100 that originates the exception state, a type of an exception for the exception state, an action for handling the exception state, and a timestamp that indicates a time when the exception state occurred.

In some aspects, the storage subsystem 110 is further configured to: store the report in the device memory 103 (e.g., in an error log 404 with an identifiable location in the flash memory); and retrieve the report from the device memory. In some aspects, the storage subsystem 110 is further configured to retrieve the report from the device memory 103 after the data storage device 100 is ready to process new host commands from the host system 104, following the exception state.

In some aspects, the communication interface 406 is a secure communication channel based on a Bluetooth interface for communicatively coupling the security subsystem 112 to an intermediate device (e.g., the host mobile phone 408) that is for communicatively coupling to the server system, over the Internet. In some aspects, the intermediate device is configured to run an application (e.g., the application 410) that is configured to receive the update from the server system 414.

In some aspects, the update comprises secure field firmware upgrade packets, and the storage subsystem 110 comprises a firmware handler that is configured to receive the field firmware upgrade packets, apply a change to the storage subsystem 110, and restart the data storage device 100.

In some aspects, the storage subsystem 110 is further configured to determine if the update is compatible with a functional block of the data storage device 100 before applying the update to the functional block.

The report may have the following format:

| Sample report |
| --- |
| {<br>  Exception origin,<br>  Exception type,<br>  Action planned,<br>  Timestamp,<br>} |

The report may be sometimes referred to as an error log and may be written to the device memory 103. Error logs may be maintained in a predefined format that is specific to a storage device. Additional information can be added or appended to the error log depending on debugging requirements.

After the controller 101 completes exception handling, the controller 101 may initiate a power cycle. When the data storage device 100 is ready (e.g., ready to accept commands from the host), the FTL 402 can issue a read operation to the error log location to get the details of the failure. This may include a simple read operation, and the error log location may be known to the FTL 402.

In some aspects, the sequence of operations for reporting exception states may include the following steps: (i) exception is identified by a firmware of the FTL 402; (ii) report is prepared by collecting possible data; (iii) report is written as an error log to the device memory 103 (e.g., report written to the error log 404); (iv) exception handling is initiated; (v) exception handling is completed; (vi) the data storage device 100 is restarted as needed; (vii) the FTL 402 initiates read request to error log location in the device memory 103; (viii) the report is transferred to the security subsystem 112 from the FTL 402; (ix) the security subsystem 112 initiates a connection to the server system 414 via a Bluetooth and host-security software application (e.g., the communication interface 406 and the application 410); and (x) the report is transferred to a host security application (e.g., the application 410), and subsequently to the server system 414. The report may be used for offline debugging or analysis. Automated tools may access the error logs or report.

In some aspects, updates may be transmitted from the server system 414 using the following steps. Updates may be transmitted as a secure field firmware upgrade (sFFU) packets through the same path as described above for reporting exceptions states. In some aspects, an sFFU firmware-handler (e.g., a handler in the FTL 402) in the storage subsystem 110 may apply the update and/or restart the system (e.g., the data storage system 100) to bring about the update.

In some aspects, the crash report may be mapped to a particular device architecture. For example, suppose a specific architecture includes a functional block for data transfers and another architecture includes another functional block. The two functional blocks may not be compatible with one another. To handle such situations, the firmware-handler may detect incompatibility and forego applying the update if the update is not applicable to one type of functional blocks.

In some aspects, the crash report may be sent to the server system 414. In some aspects, failure analysis and dump information (FADI) (sometimes referred to as error logs) may be transmitted along with the crash report. In some aspects, the data storage device 100 may store error logs to dedicated physical locations (e.g., the error log 404) in the device memory. The FADI may contain information that cannot be read by the host, and may be internal to the storage device 100. Typically, when the storage device 100 is reported to have a failure, it is sent to a research and development center for failure analysis. This is a tedious process where the engineers attempt to determine the root cause of the failure and devise solutions for a next release. The techniques described herein may be used to make this more efficient by automatically detecting, diagnosing and/or upgrading data storage devices. The FADI data may also be transmitted through a safe, secure manner, and/or in a phased manner. Once data is available, engineering teams can attempt to re-create the failure or trouble shoot with available information, and/or perform a comprehensive root cause analysis. In this way, teams may obtain an early insight into probable scenarios with the storage device exceptions. Any solution can be part of a next firmware upgrade. In some aspects, the firmware upgrade may wait for a next release, or may be transmitted across (e.g., via the application on the host mobile phone) as a patch through a firmware upgrade. Firmware upgrade may require users to agree to an upgrade, like in smartphones, and wait for an upgrade to finish. In some aspects, this process may be streamlined, where the user may not go through the process of reporting an issue, but can directly decide if they are willing to accept an upgrade. In some aspects, a secure Bluetooth channel may be used by the data storage device 100 to transmit the error log information.

In some aspects, steps for device upgrade are as follows.
1. The data storage device 100 detects the exception, performs necessary steps described above, as part of recovery.
2. Next, an error log is prepared, and written to the device memory 103.
3. The security subsystem 112 initiates a read operation, where a read request is sent to the device memory 103, for the error log 404.
4. Next, through the communication interface 406 (e.g., a Bluetooth channel), the security subsystem 112 initiates a SEND operation, where data is sent to the server system 414, and also informs the host application 410 (that controls secure storage device access) about the sending of error logs.
5. The server system 414 analyzes the information received, which includes product information and error logs.
6. Engineering teams may analyze the data, identify the corrective steps and enhancements, and propose an upgrade.
7. The upgrade is sent from the server system 414 to the storage device 100 using secure communication channels.
8. A user (of the application 410) may provide an input whether to apply the upgrade through the host application 410.

Figure 5:
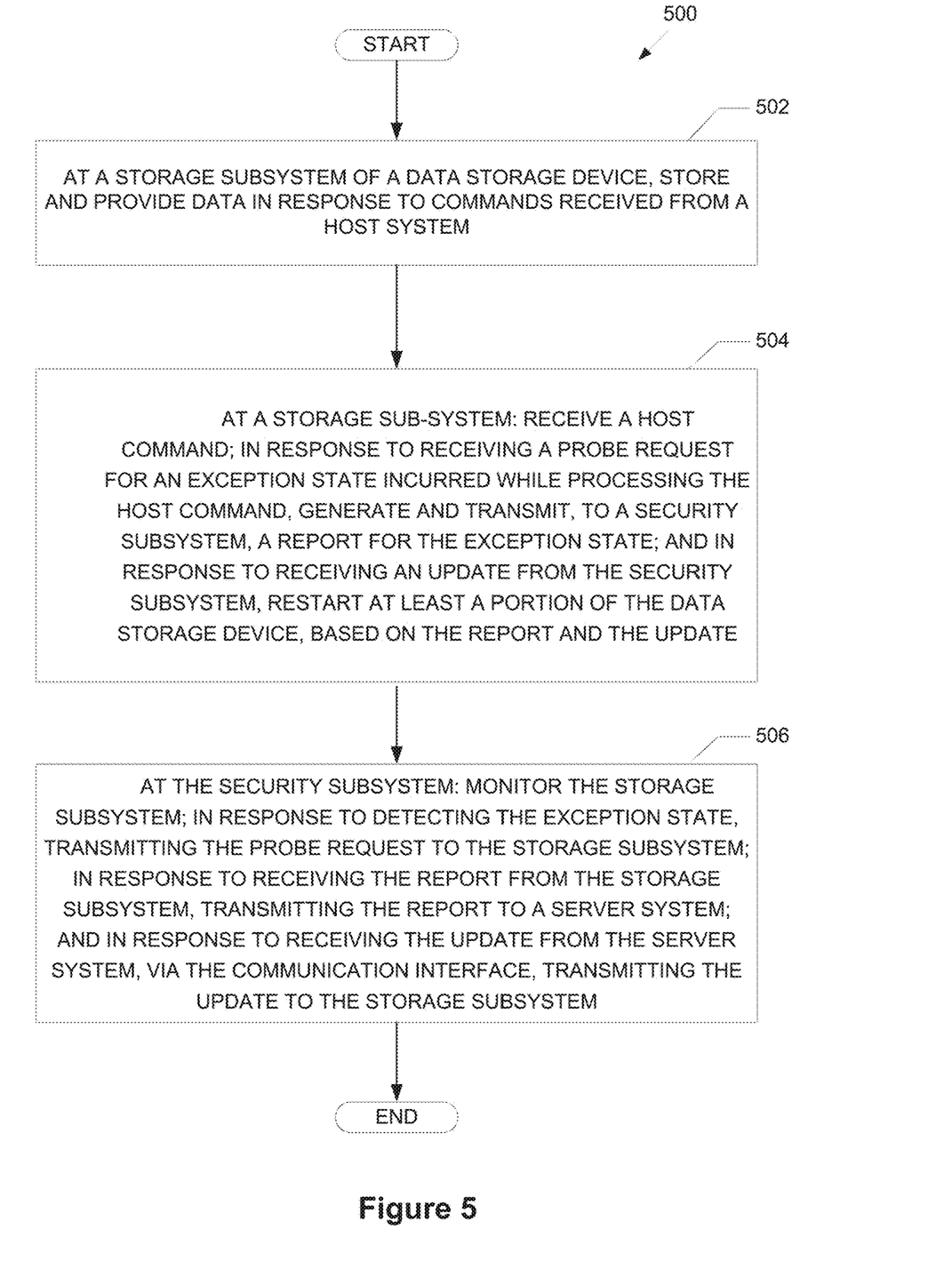
FIG. 5 is a flowchart of an example process for handling a data storage device failure, according to one or more embodiments.

It may be instructive to describe the structures shown in FIGS. 1 and 4 with respect to FIG. 5 which is a flowchart illustrating an example process 500 for handling a data storage device failure using a remote system, according to some embodiments. One or more blocks of FIG. 5 may be executed by a computing system (including, e.g., a controller 107 of a flash memory, a data storage controller 101 of a data storage system 100 or a solid-state storage device (SSD), a processor, or the like). Examples of a computing system or a controller may be the controller 101. Similarly, a non-transitory machine-readable medium may include machine-executable instructions thereon that, when executed by a computer or machine (e.g., the storage device 100 or its component(s)), perform the processes of FIG. 5. The steps of process 500 may be implemented as hardware, firmware, software, or a combination thereof. The data storage device 100 may include a host interface 105 for coupling the data storage device 100 to a host system 104. The data storage device 100 may also include a device memory 103 for storing or providing data in response to commands receive from the host system 104. The data storage device 100 may also include a controller 101 which may include a storage subsystem 110 and a security subsystem 112.

In step 502, a device memory (e.g., the device memory 103) stores or provides data in response to commands received from the host system. For example, the storage subsystem 110 may cause the device memory 103 to store or provide data.

In step 504, a storage subsystem (e.g., the storage subsystem 110) of a controller (e.g., the controller 101) may receive a host command from a host interface (e.g., the host interface 105), and process the host command for the device memory 103. In response to receiving a probe request for an exception state incurred while processing the host command, the storage subsystem generates and transmits, to a security subsystem (e.g., the security subsystem 112), a report for the exception state; and in response to receiving an update from the security subsystem, restart at least a portion of the controller, based on the report and the update.

In step 506, the security subsystem performs the following steps: monitors the storage subsystem for the exception state; in response to detecting the exception state, transmitting the probe request to the storage subsystem; in response to receiving the report from the storage subsystem, transmits the report to the server system via the communication interface; and in response to receiving the update from the server system, via the communication interface, transmit the update to the storage subsystem.

In some aspects, the storage subsystem generates reports on exceptions in the storage subsystem for debugging and/or further processing, and the security subsystem stays active for transferring the report. In some aspects, the FTL in the storage subsystem generates error logs. In some aspects, the security subsystem initiates probing after detecting the exception state in the storage subsystem. Following that, the FTL prepares the report. In some aspects, the controller may include two different processors, one corresponding to the storage subsystem and the other corresponding to the security subsystem. In some aspects, data may be exchanged through inter-processor communication (IPC) messages between the two processors.

Various example embodiments and aspects of the disclosure are described below for convenience. These are provided as examples, and do not limit the subject technology. Some of the examples described below are illustrated with respect to the figures disclosed herein simply for illustration purposes without limiting the scope of the subject technology.

One or more aspects of the subject technology provide a data storage device (e.g., the data storage system 100) that includes a host interface for coupling the data storage device to a host system. The data storage device includes a device memory for storing or providing data in response to commands receive from the host system. The data storage device also includes a controller comprising a storage subsystem and a security subsystem. The storage subsystem is configured to: receive a host command from the host interface; and process the host command for the device memory. The security subsystem comprises a device recovery circuit configured to: monitor the storage subsystem for an exception state; and reinitialize pending operations for the storage subsystem after the exception state.

In some aspects, the device recovery circuit is further configured to cause throttling the host system if the storage subsystem takes longer than a predetermined threshold time to recover from the exception state.

In some aspects, the security subsystem is further configured to control the host interface when the storage subsystem recovers from the exception state.

In some aspects, the exception state is caused by at least one of: a processor failure, a hardware error, a firmware deadlock, or a firmware assert.

In some aspects, the device recovery circuit is further configured to monitor the storage subsystem for the exception state at periodic time intervals.

In some aspects, the device recovery circuit is further configured to cause transmitting a crash dump to the host system and receive updates.

In some aspects, the device recovery circuit is further configured to store the pending operations for the storage subsystem at periodic time intervals.

In some aspects, the security subsystem includes a host queue, and the device recovery circuit is further configured to store the pending operations in the host queue.

In some aspects, the controller includes a front-end memory configured to store the commands received from the host system, and the device recovery circuit is further configured to store the pending operations for the storage subsystem in a same order as the commands received from the host system in the front-end memory.

In some aspects, the controller is further configured to provide a state of the storage subsystem to the device recovery circuit during initialization of the storage subsystem, and wherein the device recovery circuit is further configured to use the state of the storage subsystem to reinitialize the pending operations for the storage subsystem.

In some aspects, the device recovery circuit is further configured to cause throttling the host system based on the exception state.

In some aspects, the data storage device is configured to include a plurality of power domains that includes a first power domain to power the storage subsystem that is different from a second power domain to power the security subsystem.

In some aspects, the data storage device is configured to continue to power the security subsystem after the storage subsystem enters the exception state or during recovery of the storage subsystem from the exception state.

In some aspects, the security subsystem includes a static memory and the host queue is disposed in the static memory.

In some aspects, the device recovery circuit is further configured to initialize a warm boot or a cold boot for the storage subsystem based on the exception state.

In some aspects, the device recovery circuit is further configured to: determine a category of the exception state; in accordance with a determination that the category of the exception state is a firmware assert or a deadlock due to software errors, cause a warm boot of the storage subsystem; and in accordance with a determination that the category of the exception state is a processor halt or a crash due to hardware errors, cause a cold boot that includes a complete reboot of the storage subsystem.

In some aspects, the device recovery circuit is further configured to copy, from the storage subsystem, information related to garbage collection, write or read exception handling, or firmware control block updates to the device memory, based on the exception state.

In some aspects, the device recovery circuit is further configured to generate a crash report based on the exception state.

In some aspects, the crash report includes an origin of the exception state, a type of the exception state, information related to a failing command for the exception state, or a command serviced during the exception state, or a timestamp for the exception state.

In other aspects, a method is implemented using one or more controllers for one or more storage devices. The method includes storing or providing data, at a device memory, in response to commands received from a host system. The method also includes, at a storage subsystem: receiving a host command from the host interface; and processing the host command for the device memory. The method may also include: at a device recovery circuit of a security subsystem: monitoring the storage subsystem for an exception state; and reinitialize pending operations for the storage subsystem after the exception state.

In further aspects, a system includes: means for coupling a host system to a data storage device; means for storing or providing data in response to commands received from the host system; means for receiving a host command from the host interface in a storage subsystem; means for processing the host command in the storage subsystem; means for monitoring the storage subsystem for an exception state; and means for reinitialize pending operations for the storage subsystem after the exception state.

One or more aspects of the subject technology provide a data storage device (e.g., the data storage system 100) that includes a host interface for coupling the data storage device to a host system; a device memory for storing or providing data in response to commands received from the host system; a communication interface for communicatively coupling the data storage device to a server system; and a controller. The controller comprises a storage subsystem configured to: receive a host command from the host interface; in response to receiving a probe request for an exception state incurred while processing the host command: generate and transmit, to a security subsystem, a report for the exception state; and in response to receiving an update from the security subsystem, restart at least a portion of the controller, based on the report and the update. The controller also includes the security subsystem configured to: monitor the storage subsystem for the exception state; in response to detecting the exception state, transmitting the probe request to the storage subsystem; in response to receiving the report from the storage subsystem, transmit the report to the server system via the communication interface; and in response to receiving the update from the server system, via the communication interface, transmit the update to the storage subsystem In some aspects, the storage subsystem is further configured to handle the exception state. In some aspects, the storage subsystem is further configured to generate the report while handling the exception state. In some aspects, the storage subsystem is further configured to, after the exception state is handled, initiate a power cycle for the data storage device to prepare the device memory to accept new host commands.

In some aspects, the exception state is caused by at least one of: a processor failure, a hardware error, a firmware deadlock, or a firmware assert.

In some aspects, the storage subsystem includes a flash translation layer that is configured to: translate a logical block address for the host command to a physical address on the device memory; and generate the report by probing different components of the storage subsystem to identify the exception state.

In some aspects, the report comprises an exception origin that indicates a component of the storage subsystem that originates the exception state, a type of an exception for the exception state, an action for handling the exception state, and a timestamp that indicates a time when the exception state occurred.

In some aspects, the storage subsystem is further configured to: store the report in the device memory; and retrieve the report from the device memory. In some aspects, the storage subsystem is further configured to retrieve the report from the device memory after the data storage device is ready to process new host commands from the host system, following the exception state.

In some aspects, the communication interface is a secure communication channel based on a Bluetooth interface for communicatively coupling the security subsystem to an intermediate device that is for communicatively coupling to the server system, over the Internet. In some aspects, the intermediate device is configured to run an application that is configured to receive the update from the server system.

In some aspects, the update comprises secure field firmware upgrade packets, and the storage subsystem comprises a firmware handler that is configured to receive the field firmware upgrade packets, apply a change to the storage subsystem, and restart the data storage device.

In some aspects, the storage subsystem is further configured to determine if the update is compatible with a functional block of the data storage device before applying the update to the functional block.

In other aspects, a method is implemented using one or more controllers for one or more storage devices. The method includes storing or providing data, at a device memory, in response to commands received from a host system. The method also includes, at a storage subsystem: receiving a host command from a host interface that couples the data storage device to the host system; in response to receiving a probe request for an exception state incurred while processing the host command, generating and transmitting, to a security subsystem, a report for the exception state; and in response to receiving an update from the security subsystem, restarting at least a portion of the data storage device, based on the report and the update. The method also includes, at the security subsystem: monitoring the storage subsystem for the exception state; in response to detecting the exception state, transmitting the probe request to the storage subsystem; in response to receiving the report from the storage subsystem, transmitting the report to a server system; and in response to receiving the update from the server system, via the communication interface, transmitting the update to the storage subsystem.

In further aspects, a system includes: means for coupling a data storage device to a host system; means for storing or providing data, at a device memory, in response to commands received from the host system; means for communicatively coupling the data storage device to a server system; means for receiving a host command from the host system; means for processing the host command; means for detecting an exception state while processing the host command: means for generating a report for the exception state; means for receiving an update based on the report, in response to transmitting the report; means for restarting at least a portion of the data storage device, based on the report and the update; means for transmitting the report to the server system via the communication interface, in response to receiving the report; means for receiving the update from the server system, in response to transmitting the report; and means for transmitting the update to the storage subsystem, in response to receiving the update.

Various implementations of the methods and systems may be used for exception handling using a security subsystem. The techniques described herein may be used to reduce solid state drive (SSD) random access memory (RAM) footprint, and provide resilience, fault tolerance and/or fault or exception handling that improve the functioning of the storage device or SSD in the event of exceptions and/or crashes. In some aspects, because the security subsystem is powered by a different power domain than the storage subsystem, the security subsystem ensures the storage subsystem to recover from errors or faults even after the storage subsystem has crashed or recovered from an exception. In some aspects, the recovery is transparent to or without involving the host.

In one or more aspects, a method includes one or more methods, operations or portions thereof described herein. In one or more aspects, an apparatus includes one or more memories and one or more processors, the one or more processors configured to cause performing one or more methods, operations or portions thereof described herein. In one or more aspects, an apparatus includes means adapted for performing one or more methods, operations or portions thereof described herein. In one or more aspects, a hardware apparatus includes circuits configured to perform one or more methods, operations or portions thereof described herein. In one or more aspects, an apparatus includes components operable to carry out one or more methods, operations or portions thereof described herein. In one or more aspects, a non-transitory machine-readable storage medium (e.g., one or more memories and/or one or more registers) store instructions that, when executed by one or more processors, cause one or more processors to perform one or more methods, operations or portions thereof described herein.

In some examples, to illustrate the interchangeability of hardware and software, items such as the various illustrative blocks, modules, components, methods, operations, instructions, and algorithms may have been described generally in terms of their functionality. In some examples, whether such functionality is implemented as hardware, software or a combination of hardware and software depends upon the particular application and design constraints imposed on the overall system. Skilled artisans may implement the described functionality in varying ways for each particular application.

Headings and subheadings, if any, are used for convenience only and do not limit the invention. The word "exemplary" is used to mean serving as an example or illustration. Any implementation described herein as an "example" is not necessarily to be construed as preferred or advantageous over other implementations. Relational terms such as first and second and the like may be used simply for ease of understanding without necessarily requiring or implying any actual relationship or order between elements or actions and without necessarily requiring or implying that they have different characteristics unless stated otherwise.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" and "at least one of A, B, or C" may refer to only A, only B, or only C; any combination of A, B, and C; and/or at least one of each of A, B, and C.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C. Furthermore, an expression "element A/element B" may be understood as element A and/or element B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two.

In one or more aspects, the terms "each other" and "one another" may be used interchangeably simply for convenience unless stated otherwise. For example, an expression "different from each other" may be understood as being different from one another. In another example, an expression "different from one another" may be understood as being different from each other. In one or more examples, the number of elements involved in the foregoing expression may be two. In one or more examples, the number of elements involved in the foregoing expression may be more than two.

Features of various embodiments of the present disclosure may be partially or wholly coupled to or combined with each other and may be variously inter-operated, linked or driven together. The embodiments of the present disclosure may be carried out independently from each other or may be carried out together in a co-dependent or related relationship. In one or more aspects, the components of each apparatus according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order, with the exception of steps and/or operations necessarily occurring in a particular order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In describing a temporal relationship, when the temporal order is described as, for example, "after," "subsequent," "next," "before," "preceding," "prior to," or the like, a case that is not consecutive or not sequential may be included unless a more limiting term, such as "just," "immediate(ly)," or "direct(ly)," is used.

It is understood that, although the term "first," "second," or the like may be used herein to describe various elements, these elements should not be limited by these terms. These terms are only used to distinguish one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

In one or more examples, when an element is "connected" or "coupled" to another element, the element can be directly connected or coupled to another element, and can be indirectly connected or coupled to another element with one or more intervening elements disposed or interposed between the elements, unless otherwise specified.

The disclosure is provided to enable any person skilled in the art to practice the various aspects described herein. In some instances, when a detailed description of well-known functions or configurations may unnecessarily obscure aspects of the present disclosure, the detailed description thereof may be omitted. The disclosure provides various examples of the subject technology, and the subject technology is not limited to these examples. Various modifications to these aspects will be readily apparent to those skilled in the art, and the principles described herein may be applied to other aspects.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

The shapes, sizes, areas, ratios, numbers, and the like disclosed in the drawings for describing implementations of the present disclosure are merely examples, and thus, the present disclosure is not limited to the illustrated details.

When the term "comprise," "have," "include," "contain," "constitute," or the like is used, one or more other elements may be added unless a term such as "only" or the like is used. The terms used in the present disclosure are merely used in order to describe particular embodiments, and are not intended to limit the scope of the present disclosure. The terms used herein are merely used in order to describe example embodiments, and are not intended to limit the scope of the present disclosure. The terms of a singular form may include plural forms unless the context clearly indicates otherwise. An element proceeded by "a," "an," "the," or "said" does not, without further constraints, preclude the existence of additional elements.

In one or more aspects, an element, feature, or corresponding information (e.g., a level, range, dimension, size, or the like) is construed as including an error or tolerance range even where no explicit description of such an error or tolerance range is provided. An error or tolerance range may be caused by various factors (e.g., process factors, internal or external impact, or the like). Furthermore, while the subject disclosure may provide many example ranges and values, these are non-limiting examples, and other ranges and values are within the scope of the subject technology.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A data storage device, comprising:
a host interface for coupling the data storage device to a host system;
a device memory for storing or providing data in response to commands received from the host system; and
a communication interface for communicatively coupling the data storage device to a server system;
a controller comprising:
a storage subsystem configured to:
receive a host command from the host interface;
in response to receiving a probe request for an exception state incurred while processing the host command:
generate and transmit, to a security subsystem, a report for the exception state; and
in response to receiving an update from the security subsystem, restart at least a portion of the controller, based on the report and the update; and
the security subsystem configured to:
monitor the storage subsystem for the exception state;

in response to detecting the exception state, transmitting the probe request to the storage subsystem;

in response to receiving the report from the storage subsystem, transmit the report to the server system via the communication interface; and in response to receiving the update from the server system, via the communication interface, transmit the update to the storage subsystem.

2. The data storage device of claim 1, wherein the storage subsystem is further configured to handle the exception state.

3. The data storage device of claim 2, wherein the storage subsystem is further configured to generate the report while handling the exception state.

4. The data storage device of claim 2, wherein the storage subsystem is further configured to, after the exception state is handled, initiate a power cycle for the data storage device to prepare the device memory to accept new host commands.

5. The data storage device of claim 1, wherein the exception state is caused by at least one of: a processor failure, a hardware error, a firmware deadlock, or a firmware assert.

6. The data storage device of claim 1, wherein the storage subsystem includes a flash translation layer that is configured to:

translate a logical block address for the host command to a physical address on the device memory; and generate the report by probing different components of the storage subsystem to identify the exception state.

7. The data storage device of claim 1, wherein the report comprises an exception origin that indicates a component of the storage subsystem that originates the exception state, a type of an exception for the exception state, an action for handling the exception state, and a timestamp that indicates a time when the exception state occurred.

8. The data storage device of claim 1, wherein the storage subsystem is further configured to:

store the report in the device memory; and retrieve the report from the device memory.

9. The data storage device of claim 8, wherein the storage subsystem is further configured to retrieve the report from the device memory after the data storage device is ready to process new host commands from the host system, following the exception state.

10. The data storage device of claim 1, wherein the communication interface is a secure communication channel based on a Bluetooth interface for communicatively coupling the security subsystem to an intermediate device that is for communicatively coupling to the server system, over the Internet.

11. The data storage device of claim 10, wherein the intermediate device is configured to run an application that is configured to receive the update from the server system.

12. The data storage device of claim 1, wherein the update comprises secure field firmware upgrade packets, and the storage subsystem comprises a firmware handler that is configured to receive the secure field firmware upgrade packets, apply a change to the storage subsystem, and restart the data storage device.

13. The data storage device of claim 1, wherein the storage subsystem is further configured to determine if the update is compatible with a functional block of the data storage device before applying the update to the functional block.

14. A method for a data storage device, the method comprising:

storing or providing data, in a device memory, in response to commands received from a host system;

at a storage subsystem:

receiving a host command from a host interface that couples the data storage device to the host system;

in response to receiving a probe request for an exception state incurred while processing the host command, generating and transmitting, to a security subsystem, a report for the exception state; and in response to receiving an update from the security subsystem, restarting at least a portion of the data storage device, based on the report and the update; and at the security subsystem:

monitoring the storage subsystem for the exception state;

in response to detecting the exception state, transmitting the probe request to the storage subsystem;

in response to receiving the report from the storage subsystem, transmitting the report to a server system; and in response to receiving the update from the server system, via a communication interface, transmitting the update to the storage subsystem.

15. The method of claim 14, further comprising:

at the storage subsystem, handling the exception state.

16. The method of claim 15, further comprising:

at the storage subsystem, generating the report while handling the exception state.

17. The method of claim 15, further comprising:

at the storage subsystem, after the exception state is handled, initiating a power cycle for the data storage device to prepare the device memory to accept new host commands.

18. The method of claim 14, wherein the exception state is caused by at least one of: a processor failure, a hardware error, a firmware deadlock, or a firmware assert.

19. The method of claim 15, further comprising:

at a flash translation layer of the storage subsystem:

translating a logical block address for the host command to a physical address on the device memory; and generating the report by probing different components of the storage subsystem to identify the exception state.

20. A system, comprising:

means for coupling a data storage device to a host system;

means for storing or providing data, at a device memory, in response to commands received from the host system;

means for communicatively coupling the data storage device to a server system;

means for receiving a host command from the host system;

means for processing the host command;

means for receiving a probe request for an exception state incurred while processing the host command;

means for generating a report for the exception state;

means for receiving an update based on the report, in response to transmitting the report;

means for restarting at least a portion of the data storage device, based on the report and the update;

means for monitoring and detecting the exception state;

means for transmitting a probe request, in response detecting the exception state;

means for transmitting the report to the server system, in response to receiving the report;
means for receiving the update from the server system, in response to transmitting the report; and
means for transmitting the update to a storage subsystem, in response to receiving the update.

\* \* \* \* \*